US007013275B2

(12) United States Patent
Arnold et al.

(10) Patent No.: US 7,013,275 B2
(45) Date of Patent: Mar. 14, 2006

(54) METHOD AND APPARATUS FOR PROVIDING A DYNAMIC SPEECH-DRIVEN CONTROL AND REMOTE SERVICE ACCESS SYSTEM

(75) Inventors: James F. Arnold, Helena, MN (US); Horacio E. Franco, Menlo Park, CA (US); David J. Israel, Palo Alto, CA (US); Christopher Culy, Mountain View, CA (US)

(73) Assignee: SRI International, Menlo Park, CA (US)

( * ) Notice: Subject to any disclaimer, the term of this patent is extended or adjusted under 35 U.S.C. 154(b) by 626 days.

(21) Appl. No.: 10/033,772

(22) Filed: Dec. 28, 2001

(65) Prior Publication Data

US 2003/0125955 A1 Jul. 3, 2003

(51) Int. Cl.
*G10L 15/18* (2006.01)
*G10L 15/22* (2006.01)

(52) U.S. Cl. .................... 704/244; 704/257; 704/270.1
(58) Field of Classification Search ................ 704/231, 704/233, 243, 244, 246, 250, 251, 255, 270, 704/270.1, 275
See application file for complete search history.

(56) References Cited

U.S. PATENT DOCUMENTS

| 5,425,128 A | 6/1995 | Morrison |
| 5,748,974 A | 5/1998 | Johnson |
| 5,752,232 A | 5/1998 | Basore et al. ............... 704/275 |
| 5,774,628 A * | 6/1998 | Hemphill .................... 704/255 |
| 5,864,810 A | 1/1999 | Digalakis et al. ........... 704/255 |
| 5,956,683 A * | 9/1999 | Jacobs et al. ............. 704/270.1 |
| 6,070,139 A | 5/2000 | Miyazawa et al. .......... 704/275 |
| 6,085,160 A | 7/2000 | D'hoore et al. ............. 704/256 |
| 6,112,103 A | 8/2000 | Puthuff ....................... 455/557 |
| 6,122,613 A | 9/2000 | Baker ......................... 704/235 |
| 6,157,705 A | 12/2000 | Perrone |
| 6,182,038 B1 * | 1/2001 | Balakrishnan et al. ...... 704/250 |
| 6,185,535 B1 | 2/2001 | Hedin et al. ................ 704/270 |
| 6,188,985 B1 * | 2/2001 | Thrift et al. ................ 704/275 |
| 6,195,641 B1 | 2/2001 | Loring et al. ............... 704/275 |
| 6,216,104 B1 | 4/2001 | Moshfeghi et al. ......... 704/326 |
| 6,223,157 B1 | 4/2001 | Fisher et al. ................ 704/250 |
| 6,233,561 B1 | 5/2001 | Junqua et al. .............. 704/277 |
| 6,233,570 B1 | 5/2001 | Horvitz et al. |
| 6,246,981 B1 | 6/2001 | Papineni et al. ............ 704/235 |
| 6,256,607 B1 | 7/2001 | Digalakis et al. ........... 704/222 |
| 6,260,035 B1 | 7/2001 | Horvitz et al. |
| 6,262,730 B1 | 7/2001 | Horvitz et al. |

(Continued)

FOREIGN PATENT DOCUMENTS

JP  2000-172483  6/2000

OTHER PUBLICATIONS

Kuhn et al., "A Cache-Based Natural Language Model for Speech Recognition," IEEE Transactions on Pattern Analysis and Machine Intelligence, vol. 12, No. 6, Jun. 1990, pp. 570 to 583.*

*Primary Examiner*—Richemond Dorvil
*Assistant Examiner*—Martin Lerner
(74) *Attorney, Agent, or Firm*—Kin-Wah Tong, Esq.; Patterson & Sheridan, LLP

(57) ABSTRACT

An apparatus and a concomitant method for speech recognition. In one embodiment, a distributed speech recognition system provides speech-driven control and remote service access. The distributed speech recognition system comprises a client device and a central server.

31 Claims, 2 Drawing Sheets

U.S. PATENT DOCUMENTS

| | | |
|---|---|---|
| 6,278,973 B1 * | 8/2001 | Chung et al. ................ 704/257 |
| 6,363,348 B1 * | 3/2002 | Besling et al. ........... 704/270.1 |
| 6,490,560 B1 * | 12/2002 | Ramaswamy et al. ...... 704/250 |
| 6,604,077 B1 * | 8/2003 | Dragosh et al. ......... 704/270.1 |
| 6,738,743 B1 * | 5/2004 | Sharma et al. ........... 704/270.1 |
| 2001/0034603 A1 * | 10/2001 | Thrift et al. .............. 704/270.1 |

* cited by examiner

METHOD AND APPARATUS FOR PROVIDING A DYNAMIC SPEECH-DRIVEN CONTROL AND REMOTE SERVICE ACCESS SYSTEM

The present invention relates to an apparatus and concomitant method for accessing remote information and/or services. More specifically, the present invention provides a new architecture that allows speech-driven control and remote access of information and services, where the speech recognition and speech processing capability of a remote device can be dynamically altered.

BACKGROUND OF THE DISCLOSURE

Remote devices such as portable devices have gained wide acceptance throughout many modern societies. Portable devices include but are not limited to, cell phones, pagers, personal digital assistants (PDAs), portable global positioning devices, and networked systems within automobiles. Although such portable devices are initially designed to perform predefined tasks that are often limited to a narrow application, it is also envisioned that such devices may take on additional tasks such as accessing the World Wide Web (WWW).

However, the very nature of a portable device is its convenience which typically requires the portable device to be relatively small in physical size. Unfortunately, such requirements often constrain the processing power and the characteristics of input/output interfaces on a portable device. For example, it is generally impractical to provide a physical keyboard on a cell phone. Although an electronic keyboard can be displayed on a screen as in a PDA, such a user interface is unwieldy in performing complex tasks. Additionally, the user may be distracted while operating the portable device, e.g., while operating a vehicle.

Thus, a speech-driven user interface is desirable in a portable device. However, speech recognition systems are designed to undertake the difficult task of extracting recognized speech from an audio signal, e.g., a natural language signal. The speech recognizer within such speech recognition systems must account for diverse acoustic characteristics of speech such as vocal tract size, age, gender, dialect, and the like. Artificial recognition systems are typically implemented using powerful processors with large memory capacity to handle the various complex algorithms that must be executed to extract the recognized speech.

Unfortunately, the processing demands of speech recognition and speech processing often exceed the processing capability of current portable devices. Although the portable devices may have sufficient processing power to perform a small portion of the total functions of a full-blown speech recognition system, it is often difficult to ascertain in advance as to which tasks and associated data a portable device will need to perform a particular task. For example, the resources and processing cycles necessary to perform a speech-driven command to locate a particular web page on the Internet via a PDA is quite different than a speech-driven command to dial a preprogrammed phone number on a cellular phone system in an automobile.

Therefore, a need exists for a fast and computationally inexpensive method that allows speech-driven control and remote access of information and services, where the speech recognition and speech processing capability of a remote device can be dynamically altered.

SUMMARY OF THE INVENTION

The present invention is an apparatus and a concomitant method for speech recognition. In one embodiment, the present method is a distributed speech recognition system that provides speech-driven control and remote service access.

Specifically, the distributed speech recognition system comprises at least one client device and a central server. The client device is a remote device that is in communication with the central server, but it is physically deployed apart from the central server. In operation, the client device is equipped with a speech recognition module having an initial language model. In one embodiment, the distributed speech recognition system allows automatic "speaker adaptation" to be performed locally by the client device. Namely, local parameters such as environmental noise around the speaker, pronunciation (e.g., accents or dialect) of the speaker and/or the acoustic environment (e.g., within a tunnel or a carpeted room) around the speaker are adapted locally by the client device in performing its speech recognition functions. Speaker adaptation is particularly appropriate within the present architecture in that it is carried out in a client device largely dedicated to a particular user. Although such adaptations are performed locally, the central server may also assist the client device as necessary, e.g., forwarding a different acoustic model to the client device from the central server.

For example, in another embodiment, the distributed speech recognition system provides the ability to implement "dynamic grammars". Specifically, the client device is initially equipped with an initial language model. As the user interacts with the client device, the language model is updated by the central server as the interactions between the user and client device indicate that an updated language model is required to carry out the user's request. This distributed approach maximizes the processing power of the client device without overburdening the client device unnecessarily with a complex language model.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
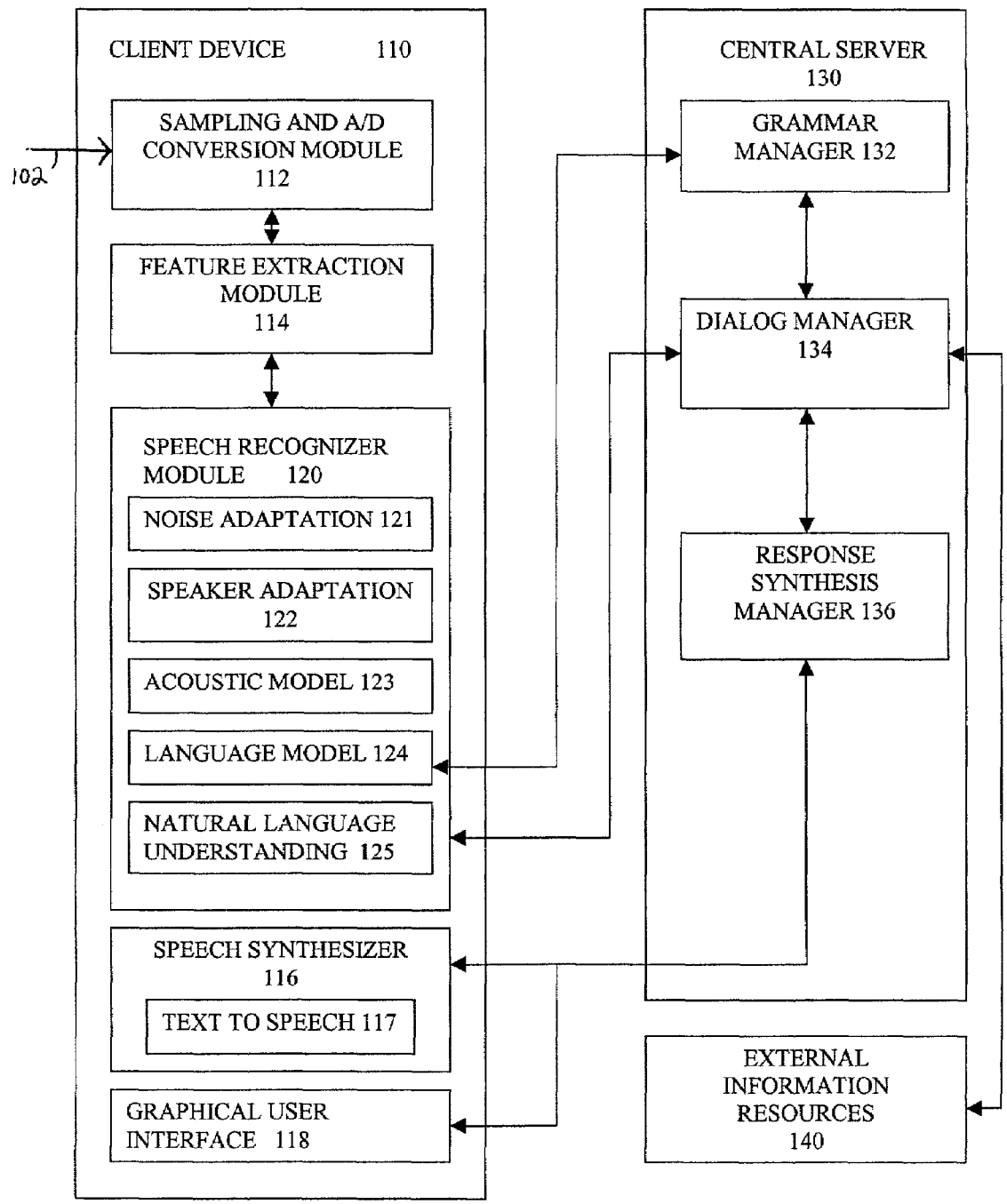
FIG. 1 illustrates a block diagram of a speech recognition system of the present invention.

FIG. 1 illustrates a block diagram of a distributed speech recognition device or system 100 of the present invention. The distributed speech recognition system 100 comprises at least one client device 110 and a central server 130. The speech recognition system 100 is designed to provide speech-driven control and remote service access via a client device.

Figure 2:
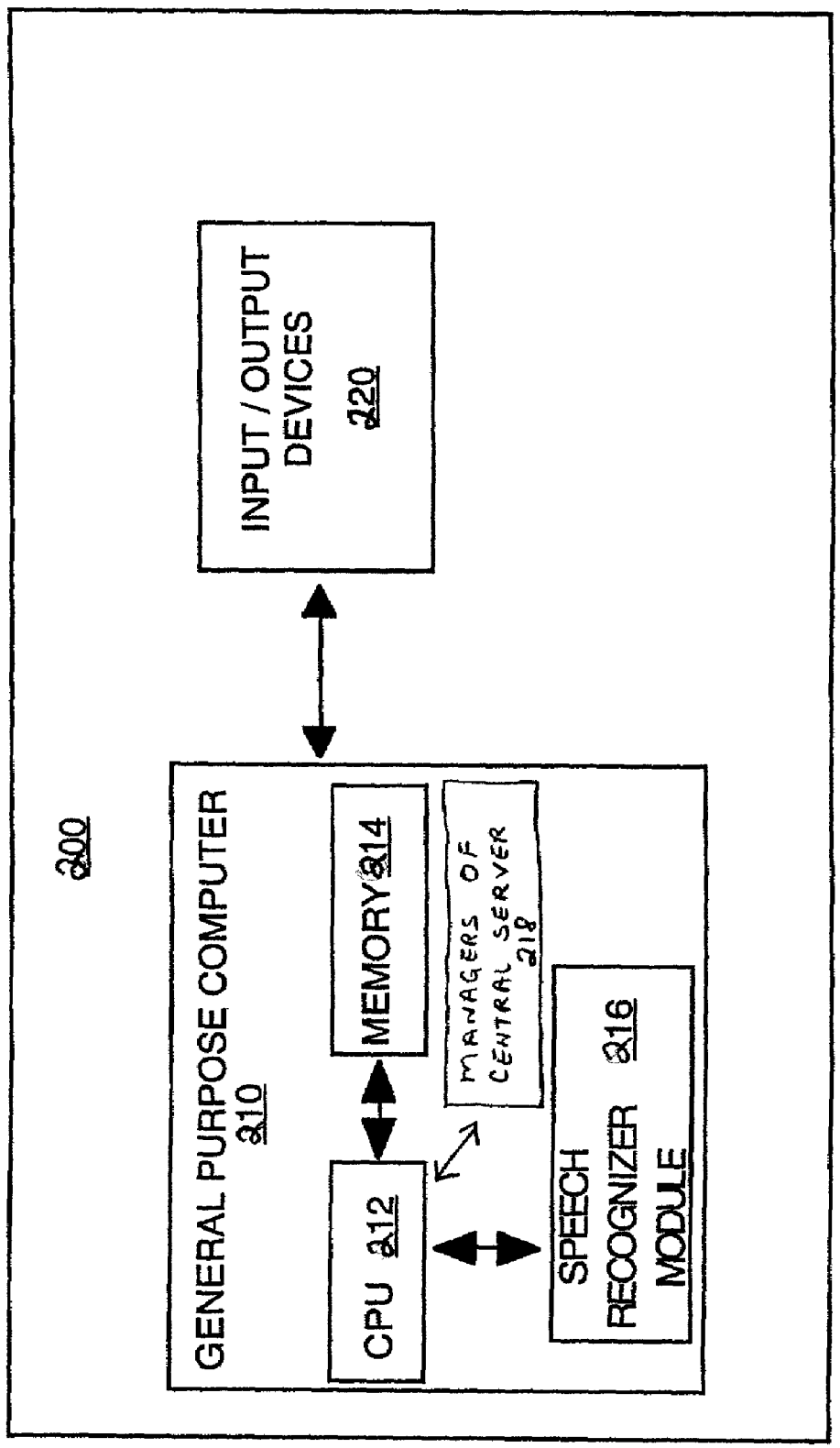
FIG. 2 illustrates a block diagram of a speech recognition system of the present invention as implemented using a general purpose computer.

In one embodiment, each of the client devices 110 and central server 130 is implemented using a general purpose computer or any other hardware equivalents as shown in FIG. 2 below. Although a "client device" 110 of the speech recognition system 100 is preferably implemented as a portable device, it should be noted that the client device can also be implemented using a larger computer system, e.g., a desktop computer or server, an office PBX and the like as required in a particular application.

Each of the client devices comprises a sampling and Analog-to-Digital (AID) conversion module 112, a feature extractor or feature extraction module 114, a speech recognizer or a speech recognizer module 120 and various Input/Output (I/O) devices, e.g., a speech synthesizer 116, a graphical user interface 118, a microphone (not shown), an audio speaker (not shown) and the like. In operation, an input audio signal (e.g., a speech signal) on path 102 is received by the sampling and Analog-to-Digital (A/D) conversion module 112, where the input signal is sampled and digitized from a microphone into a sequence of samples that are later processed by a processor.

The digitized sequence of samples is then forwarded to the feature extraction module 114. The sample sequence is first grouped into frames (commonly 1 centi-second in length) and speech features are extracted for each of the frames using various signal processing methods. Some examples of these are Mel-cepstral features, or PLP cepstral features.

Specifically, conventional feature extraction methods for automatic speech recognition generally rely on power spectrum approaches, whereby the acoustic signals are generally regarded as a one dimensional signal with the assumption that the frequency content of the signal captures the relevant feature information. This is the case for the spectrum representation, with its Mel or Bark variations, the cepstrum, FFT-derived (Fast Fourier Transform) or LPC-derived (Linear Predictive Coding), LPC derived features, the autocorrelation, the energy content, and all the associated delta and delta-delta coefficients.

Cepstral parameters are effectively used for efficient speech and speaker recognition. Originally introduced to separate the pitch contribution from the rest of the vocal cord and vocal tract spectrum, the cepstrum has the additional advantage of approximating the Karhunen-Loeve transform of speech signal. This property is highly desirable for recognition and classification. In one embodiment of the present invention, the speech features generated by the feature extraction module 114 can be Mel-cepstral features, or PLP cepstral features.

It should be noted that the present invention is not limited to a particular type of feature, as long as the same features are used to train the models and used during the recognition process. Namely, the present invention is not feature dependent.

In turn, the speech recognizer 120 receives the speech features and is able to decode the "recognized text" from the speech features using various models as discussed below. An important aspect of the present invention pertains to the "dynamic" models that are employed by the speech recognizer 120. Specifically, due to the anticipated small footprint of the client device 110, the present invention employs "dynamic grammars" as a driving mechanism in providing the necessary models or portions or updates of a model to the client device. Since the processing capability and storage capability of the client device 110 are anticipated to be limited, the present invention is designed to provide the client device 110 with just enough data and information to perform the tasks as required by a current speaker. Thus, the client device is adapting its models in response to the speaker, hence the term "dynamic grammars". The speaker adaptation functions are executed in cooperation with the central server 130.

Specifically, the central server 130 comprises a grammar manager 132, a dialog manager 134 and a response synthesis manager 136. In operation, the grammar manager 132 is in communication with the client device to provide updates to the language model on the client device as required in response to the requests of a speaker. The dialog manager 134 is tasked with deciphering, processing and anticipating the requests of a speaker (e.g., What is the speaker requesting?, What questions must be asked of the speaker to properly understand the request?, What additional information is needed to properly execute the speaker's request?, What subsequent additional requests are expected from the speaker after the answer or service is provided to the speaker for a first request?, and so on). Finally, the response synthesis manager 136 provides the necessary responses to interact with the speaker, e.g., answers or services requested by the speaker to be displayed via an output device on the client device 110.

The operation of the speech recognition system 100 will now be described in detail. It should be noted that FIG. 1 when viewed with the discussion provided below, also serves as a flowchart for the present speaker adaptation method.

The speech recognizer 120 typically comprises a text decoder or extractor (not shown), acoustics model(s) 123 and a language model 124. Specifically, the input speech features obtained from the utterance (input audio signal) are decoded using the acoustic models 123 and a language model 124. The acoustic models are trained using a large amount of training speech. Typically, acoustic models are Hidden Markov Models (HMMs) trained for each sound unit (phone, triphone, etc.). Each HMM usually has 3 states and each state may be modeled using one or more gaussians. Some of the states may be tied by sharing the same gaussians. The HMM techniques are used to identify the most likely sequence of words that could have produced the speech signal.

However, one problem with the HMM based speech recognition is the mismatch between the speech data used for training and during testing/use. Typical training data is obtained under controlled environments that are noise free. However, the test speech is obtained in real world conditions which are usually noisy. This mismatch leads to a loss in performance. Thus, the present invention optionally incorporates a noise adaptation module 121 to compensate for the mismatch.

Numerous noise adaptation methods are available. For example, a noise adaptation method is disclosed in US patent application entitled "Method And Apparatus For Recognizing Speech In A Noisy Environment", filed on Aug. 15, 2001 with a Ser. No. 09/930,389, which is commonly assigned to the assignee of this application and is hereby incorporated in its entirety by reference.

Thus, one aspect of the present speaker adaptation method is the ability to implement noise adaptation locally in response to the user's ever changing noise environment. As the speaker moves through different noise environments, the noise adaptation module 121 will account for the background noise in performing the speech recognition functions.

The language model 124 may incorporate a variety of knowledge sources, e.g., syntactic knowledge and semantic knowledge. Syntactic knowledge is defined as pertaining to the combination of words to form grammatically correct strings such as sentences or phrases. Semantic knowledge is defined as pertaining to the understanding of the task domain so as to be able to validate sentences or phrases that are consistent with the task being performed, or which are consistent with previously decoded sentences. Often, when only syntactic constraints are used, the language model is called a "grammar". However, a large vocabulary speech-recognition system, with a simple acoustic command-and-control model, is critically dependent on linguistic information embedded in the input speech. As such, for large vocabulary speech recognition, incorporation of knowledge of the language, in the form of a "language model", is essential.

However, the very size and complexity of a comprehensive language model may overwhelm the processing capability and storage capacity of a speech recognizer 120 that is deployed in a client device 110. To address this criticality, the present speech recognition system is implemented as a distributed system. Namely, the speech recognizer 120 is initialized with a small language model that is tasked to identify a broad range of top-level user requests (e.g., for travel applications: general inquiries about restaurants, telephone numbers, travel directions, flights information for an airport, weather conditions for a particular city, traffic conditions for a particular road way and so on). Once a top-level user request is identified by the natural language understanding module 125 in cooperation with the dialog manager 134, the language model within the client device is updated by the grammar manager 132. Thus, the embedded speech recognizer 120 can be implemented as a high-accuracy, stand-alone recognizer capable of swapping language models on the fly, and capable of forwarding recognized utterances to a central facility, e.g., to the dialog manager 136 via the natural language understanding module 125.

Specifically, natural language understanding module 125 and dialog manager 134 may each incorporate semantic knowledge and pragmatic knowledge resources. Pragmatic knowledge pertains to knowledge of the task or other contextual information that is used, for example, in resolving ambiguity. Namely, natural language understanding module or the natural language grammar/parser 125 extracts meaning from a recognized utterance, and encapsulates the content in a standard Knowledge Representation (KR) format for use by the dialog manager 134.

Alternatively, it should be noted that natural language understanding module 125 could be optionally omitted in the present speech recognition distributed system if a more restrictive grammar is deployed. In other words, the present speaker adaptation and dynamic grammars methods can still be implemented without the need to provide natural language capability, if reduction in complexity is required in a particular application.

In operation, the present distributed system allows the user to carry out informational and transactional tasks by consulting with an unhurried and empowered speech-capable recognition system. It allows a user to initiate and drive the conversation, with the distributed speech recognition system gently guiding the process to a quick resolution.

For example, a user may request a cab to an airport, which is a common task with more complexities than may be immediately apparent. The conversation between the user and the distributed system may be as follows:

User: I need to get to the airport.
System: SFO?
User: Oh, right. Yes. SFO.
System: When do you need to go?
User: Around 3 pm. Today.
System: Would a . . . (interrupted by the user)
User: No, I mean my flight is at 3 pm. I need a cab at one o'clock.
System: One pm. Yellow cab service can pick you up at . . . (interrupted by the user)
User: Sure.
System: I have your GPS location. This appears to be the Francis hotel?
User: Yes, front door.

To be usable in this task, the distributed speech recognition system must understand the user's original intent (to arrange for a cab), guide the user to answer the questions that make this possible, and allow the user to change his mind or correct mistakes in mid-stream, and specifically without having to restart the conversation. Thus, access to remote services, in this case a cab company, can be implemented seamlessly.

In one architectural embodiment, the language-enabled client device 110 performs the speech understanding processing, including speech-to-text transcriptions, as well as natural language processing to recognize the content and goal of what the user says via the natural language understanding module 125. The understanding process is carried out using a combination of downloadable models, that may include a task-specific grammar that characterizes the language involved in carrying out the user task. Downloadable models could also include a speech-recognition language model that, for example, statistically characterize the word sequences.

The client unit is supported by a remotely accessible dialog manager 134. The dialog manager's responsibility is to act on the user's requests. The dialog manager (DM) provides access, on the user's behalf, to remote information and transaction resources, such as websites and special mobile services. By keeping track of the state of the dialogue, the dialog manager determines the appropriate grammar and language model updates required at the current dialogue state. In one embodiment, these updates are then carried out by a grammar manager.

Specifically, the dialogue manager has access to models of the tasks that the user is able to perform (e.g., the task parameters that must be filled in order that a specific good and/or service be ordered) and to the resources required to help the user perform them (e.g., airplane schedules, contact information for services providers, etc.). The dialogue manager updates its model of the state of the dialogue by adding the representation of the meaning of the user's current utterance, and thereby determines the progress toward satisfaction of the user's goals. In this way, the dialogue manager also determines what language model and/or grammar is required at that point in the interaction.

Using the above airport example, the client device is initially implemented with a language model that is capable of recognizing the user's request for services associated with an airport. As the dialog continues, the dialog manager 136 maintains and updates its task models and also causes the grammar manager 132 to forward relevant updates of the language model to advance the dialog to the next stage, e.g., forwarding grammar to the client device pertaining to flights and car service information for a particular airport. In this manner, the size and complexity of the various grammar and language models on the client device can be dynamically managed and changed on the fly in response to speaker adaptation.

Finally, the dialog manager accesses the remote or external information resources 140, and forwards responses to the speech synthesizer 116 and/or graphical user interface 118 to generate outputs to the user. For example, the response synthesis manager or response synthesizer 136 constructs human-understandable text (for speech synthesis) and/or graphics in a platform-dependent manner. The text can be generated locally by the central server 130 and forwarded to the speech synthesizer 116 to be "spoken" to the user via a text to speech module 117. Alternatively, the central server may actually forward the phonemes of the text to the client device, thereby further relieving the client device of expending computational cycles to convert the text into phonemes. In essence, the degree of distribution in the processing of text to speech as a spoken response to the user can be tailored to a particular implementation.

It should be noted that the functions performed by the dialog manager 134 and natural language understanding module 125 can be adapted in accordance with the capability of a particular portable device. Namely, in one embodiment, the dialog manager 134 is implemented on the central server side, but as processing power increases on the client side, functions performed by the dialog manager can be migrated to the mobile device or vice versa. Preferably, it is desirable to locate a substantial portion of the intelligence of an intelligent speech language understanding (SLU) application in the mobile device to minimize the need to communicate with the central server 130.

Additionally, caching schemes can be employed by the speech recognizer module 120 to enhance its speech recognition functions. Namely, mobile devices are often personal to a particular user. As the user makes extensive use of the mobile device, the speech recognizer 120 will be able to identify requests that are often made by the user. As the device "learns" the habits of the user, relevant portions of the grammar and language model can be stored in the cache to improve response time. In fact, the basic language model that is initialized with the mobile device can be appended and/or adjusted in accordance with the habits of a particular user.

In fact, although the present invention discloses several local parameters (e.g., environmental noise, pronunciation and the acoustic environment around the speaker) that can be locally adapted in a client device of a distributed speech recognition system, other parameters can also be adapted locally. For example, U.S. Pat. No. 5,864,810 (issued Jan. 26, 1999) discloses a method and apparatus for speech recognition adapted to an individual speaker, which is commonly assigned to the present assignee and is herein incorporated by reference. Thus, the adaptation methods as disclosed in U.S. Pat. No. 5,864,810 can be deployed locally within the client device 110 within a larger distributed speech recognition system 100.

FIG. 2 illustrates a block diagram of a speech recognition system 200 of the present invention as implemented using a general purpose computer. The speech recognition device or system 200 comprises a processor (CPU) 212, a memory 214, e.g., random access memory (RAM) and/or read only memory (ROM), a speech recognizer module 216 or, alternatively, managers of the central server 218, and various input/output devices 220, (e.g., storage devices, including but not limited to, a tape drive, a floppy drive, a hard disk drive or a compact disk drive, a receiver, a transmitter, a speaker, a display, a speech signal input device, e.g., a microphone, a keyboard, a keypad, a mouse, an A/D converter, and the like).

Namely, speech recognizer module 216 can be the speech recognizer module 120 of FIG. 1 and managers of central server 218 can be the various managers 132, 134, 136 of FIG. 1. It should be understood that the speech recognizer module 216 and managers of central server 218 can be implemented as one or more physical devices that are coupled to the CPU 212 through a communication channel. Alternatively, the speech recognizer module 216 and managers of central server 218 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 214 of the computer. As such, the speech recognizer module 216 and managers of central server 218 (including associated methods and data structures) of the present invention can be stored on a computer readable medium, e.g., RAM memory, magnetic or optical drive or diskette and the like. Additionally, it should be understood that various modules and models (e.g., feature extraction module, language models, acoustic models, speech synthesis module, translation module and its sub-modules) as discussed above or known in the art can be stored and recalled into memory 214 for execution.

Although various embodiments which incorporate the teachings of the present invention have been shown and described in detail herein, those skilled in the art can readily devise many other varied embodiments that still incorporate these teachings.

What is claimed is:

1. Method for performing speech recognition, said method comprising the steps of:
   (a) receiving a speech signal locally from a user via a client device;
   (b) performing speech recognition on said speech signal in accordance with an embedded speech recognizer of said client device to produce a recognizable text signal, wherein said embedded speech recognizer employs a language model and a natural language understanding module;
   (c) forwarding said recognizable text signal to a remote server; and
   (d) updating said language model by dynamically receiving an update from said remote server in accordance with said recognizable text signal.

2. The method of claim 1, wherein said remote server generates said update in accordance with a task model.

3. The method of claim 2, wherein said remote server monitors one or more states of said task model to determine progress toward satisfying a goal of said user.

4. The method of claim 1, further comprising the step of:
   (e) storing at least a portion of said language model in a cache of said client device.

5. The method of claim 1, further comprising the step of:
   (b1) adapting said performance of speech recognition based on at least one local parameter of said speech signal.

6. The method of claim 5, wherein said at least one local parameter is representative of an environmental noise.

7. The method of claim 5, wherein said at least one local parameter is representative of an acoustic environment.

8. The method of claim 5, wherein said at least one local parameter is representative of a pronunciation of said user.

9. Method for performing speech recognition, said method comprising the steps of:
   (a) receiving a recognizable text signal representative of a user speech signal from a client device, wherein said recognizable text is generated using a speech recognizer having a language model and a natural language understanding module on said client device;

(b) processing said recognizable text signal in accordance with a task model; and (c) forwarding a language model update to said client device in accordance with said recognizable text signal.

10. The method of claim 9, wherein a remote server monitors one or more states of said task model to determine progress toward satisfying a goal of said user.

11. The method of claim 9, wherein said recognizable text is further generated in accordance with adapting said performance of speech recognition based on at least one local parameter of said speech signal.

12. The method of claim 11, wherein said at least one local parameter is representative of an environmental noise.

13. The method of claim 11, wherein said at least one local parameter is representative of an acoustic environment.

14. The method of claim 11, wherein said at least one local parameter is representative of a pronunciation of said user.

15. A distributed system for performing speech recognition, said system comprising:
  a client device for receiving a speech signal locally from a user, said client device having an embedded speech recognizer with a language model and a natural language understanding module for performing speech recognition on said speech signal to produce a recognizable text signal, and wherein said embedded speech recognizer further adapts said performance of speech recognition based on at least one local parameter of said speech signal; and
  a remote server for receiving said recognizable text signal and forwarding a language model update to said client device in accordance with said recognizable text signal.

16. A client device for performing speech recognition, said client device comprising:
  means for receiving a speech signal locally from a user;
  means for performing speech recognition on said speech signal to produce a recognizable text signal, wherein said speech recognition means employs a language model and a natural language understanding module;
  means for forwarding said recognizable text signal to a remote server; and
  means for updating said language model by dynamically receiving an update from said remote server in accordance with said recognizable text signal.

17. The client device of claim 16, further comprising:
  a cache for storing at least a portion of said language model.

18. The client device of claim 16, further comprising:
  means for adapting said performance of speech recognition based on at least one local parameter of said speech signal.

19. The client device of claim 18, wherein said at least one local parameter is representative of an environmental noise.

20. The client device of claim 18, wherein said at least one local parameter is representative of an acoustic environment.

21. The client device of claim 18, wherein said at least one local parameter is representative of a pronunciation of said user.

22. A server for performing speech recognition, said server comprising:
  means for receiving a recognizable text signal representative of a user speech signal from a client device, wherein said recognizable text is generated using a speech recognizer having a language model and a natural language understanding module on said client device;
  means for processing said recognizable text signal in accordance with a task model; and
  means for forwarding a language model update to said client device in accordance with said recognizable text signal.

23. The server of claim 22, wherein said forwarding means is a grammar manager.

24. The server of claim 22, further comprising:
  means for monitoring one or more states of said task model to determine progress toward satisfying a goal of said user.

25. The server of claim 24, wherein said monitoring means is a dialog manager.

26. The server of claim 22, wherein said recognizable text is further generated in accordance with adapting said performance of speech recognition based on at least one local parameter of said speech signal.

27. The server of claim 26, wherein said at least one local parameter is representative of an environmental noise.

28. The server of claim 26, wherein said at least one local parameter is representative of an acoustic environment.

29. The server of claim 26, wherein said at least one local parameter is representative of a pronunciation of said user.

30. A computer-readable medium having stored thereon a plurality of instructions, the plurality of instructions including instructions which, when executed by a processor, cause the processor to perform the steps comprising of:

(a) receiving a speech signal locally from a user via a client device;

(b) performing speech recognition on said speech signal in accordance with an embedded speech recognizer of said client device to produce a recognizable text signal, wherein said embedded speech recognizer employs a language model and a natural language understanding module;

(c) adapting said performance of speech recognition based on at least one local parameter of said speech signal;

(d) forwarding said recognizable text signal to a remote server; and (e) updating said language model by dynamically receiving an update from said remote server in accordance with said recognizable text signal.

31. A computer-readable medium having stored thereon a plurality of instructions, the plurality of instructions including instructions which, when executed by a processor, cause the processor to perform the steps comprising of:

(a) receiving a recognizable text signal representative of a user speech signal from a client device, wherein said recognizable text is generated using a speech recognizer having a language model and a natural language understanding module on said client device, and wherein said recognizable text is generated in accordance with adapting said performance of speech recognition based on at least one local parameter of said speech signal;

(b) processing said recognizable text signal in accordance with a task model; and (c) forwarding a language model update to said client device in accordance with said recognizable text signal.

* * * * *